United States Patent [19]

Townley

[11] Patent Number: 5,656,060

[45] Date of Patent: Aug. 12, 1997

[54] METHOD OF PRODUCING SUBSTANTIALLY DUST-FREE PARTICULATES

[76] Inventor: R. John Townley, 158 Las Palmas Blvd., North Fort Myers, Fla. 33903

[21] Appl. No.: 620,383

[22] Filed: Mar. 22, 1996

[51] Int. Cl.[6] .................................................. C05F 11/02
[52] U.S. Cl. ..................... 71/24; 71/11; 71/23; 71/64.09; 71/64.12
[58] Field of Search .................................. 71/11, 23, 24, 71/64.09, 64.12

[56] References Cited

U.S. PATENT DOCUMENTS

| 4,069,034 | 1/1978 | Hoover | 71/33 |
| 4,743,287 | 5/1988 | Robinson | 71/12 |
| 5,034,045 | 7/1991 | Alexander | 71/24 |
| 5,248,327 | 9/1993 | Laker et al. | 71/24 |
| 5,451,240 | 9/1995 | Trowbridge | 71/24 |

OTHER PUBLICATIONS

*Hackh's Chemical Dictionary* p. 168 1969.
*Fertilizer Nitrogen* Sauchelli, V. (ed.), New York: Reinhold Pub. Co., pp. 366–371 1964.

Primary Examiner—Deborah Jones
Assistant Examiner—Amy M. Harding
Attorney, Agent, or Firm—William E. Noonan

[57] ABSTRACT

A method is disclosed for rendering humic acid bearing particulates substantially free of dust. An aqueous solution that includes one of a caustic humate and a caustic soda is prepared and mixed with humic acid bearing particulates in a concentration and for a duration such that an adhesive humate gel forms about the particulates. The gel causes adjoining particulates to bind together. The mixture is allowed to dry such that the mixture is substantially free of dust-size particulates.

19 Claims, No Drawings

METHOD OF PRODUCING SUBSTANTIALLY DUST-FREE PARTICULATES

FIELD OF THE INVENTION

This invention relates to a method for processing particulates of a humic acid bearing material and similar particulates of coal and fly ash so that those particulates are substantially free of dust. More particularly, this invention relates to a method of rendering leonardite and other humic acid bearing materials relatively dust-free so that such materials can be conveniently handled and applied as soil conditioners and fertilizers.

BACKGROUND OF THE INVENTION

It is well known that humic acid bearing materials can be used in particulate form as soil conditioners and fertilizers. See, for example, U.S. Pat. No. 2,916,853. These materials can be applied to agricultural fields and golf courses in order to stabilize the soil and improve the root structure. Leonardite ore, a derivative of lignite coal, is a particularly effective humic acid bearing material. Normally, leonardite comprises up to about 80% humic acid.

Handling and applying leonardite and other similar humic acid bearing materials has proven to be inconvenient and annoying. In its crushed or pulverized form, leonardite produces large amounts of dust that can interfere with breathing and vision. As a result, it is usually difficult and unpleasant to apply these particulates to the soil. Even slightly windy conditions can make the application process virtually impossible. Similar problems afflict other dusty materials derived from earth soils such as coal, coal derivatives and fly ash.

SUMMARY OF INVENTION

It is therefore an object of the present invention to provide a method for rendering otherwise dust ridden particulates of a humic acid bearing material and analogous substances substantially free of dust.

It is a further object of this invention to provide a method for producing substantially dust-free particulates of leonardite material that can be utilized effectively as a fertilizer and soil conditioner in a wide variety of applications, settings and environments.

It is a further object of this invention to provide a method for producing humic acid bearing particulates that can be handled and disbursed effectively without generating annoying and interfering dust particulates.

It is a further object of this invention to provide a method of producing humic acid bearing particulates that can be applied quickly and conveniently to the soil, even in windy conditions, without generating a significant amount of dust.

It is a further object of this invention to render various earth soil particulate substances, such as coal, coal derivatives and fly ash, substantially dust-free.

This invention results from a realization that humic acid bearing particulates may be rendered dust-free by super-saturating a caustic aqueous solution with humic acid bearing particulates such that an adhesive humate gel is formed about the particulates. Likewise a non-humic acid bearing material, including various coal derivatives and fly ash, may be rendered dust-free by mixing particulates of such material with a caustic humate solution to form an adhesive gel about the particulates. In either case, this gel causes adjoining particulates to bind together, thereby eliminating dust-size particulates.

This invention features a method of rendering humic acid bearing particulates substantially free of dust size particulates. Initially, an aqueous solution is prepared. The solution includes one of a caustic humate and a caustic soda. The solution is mixed with humic acid bearing particulates in a concentration and for a duration such that an adhesive humate gel forms about the particulates. The gel causes adjoining particulates to bind together. The mixture is then allowed to dry such that the mixture is substantially free of dust size particulates. As used herein "dust-size particulates" refers to very fine particulates that are easily suspended in the air and thereby form a dust.

In a preferred embodiment the aqueous solution may include approximately 9–10 parts water and 1 part caustic humate. Alternatively, the aqueous solution may include approximately 9–10 parts water and 1 part caustic soda. It should be noted, however, that these concentrations are approximations only and may be varied somewhat within the scope of this invention.

The caustic soda is preferably selected from a group comprising potassium hydroxide, sodium hydroxide and ammonium hydroxide. The caustic humate may comprise sodium humate. In either case, the humic acid bearing particulates are typically mixed with the solution to form a colloidal suspension.

The humic acid bearing particulates preferably comprise leonardite ore. Approximately 10 parts of the particulates may be mixed with 1 part solution. Again, this concentration may be varied within the scope of this invention. The particulates are typically mixed substantially uniformly in the solution. The adjoining particulates preferably bind together in groups of particulates. A substantial majority of these groups of bound particulates are larger than the dust size particulates.

This invention also features a method of rendering particulates derived from earth soils substantially dust-free. According to this method a caustic humate is mixed with the particulates to form an adhesive gel about the particulates.

DETAILED DESCRIPTION OF PREFERRED EMBODIMENTS

The method of this invention is practiced by first obtaining a selected quantity of humic acid bearing material that is suitable for use as a soil conditioner or fertilizer. Leonardite ore is a preferred substance, although the method of this invention may be practiced with other humic bearing materials. The leonardite or analogous material is reduced to particulate form. This is accomplished by crushing or pulverizing the material or in other known manners. Any desired quantity is obtained. The precise amount is not a limitation of this invention. From this point, the particulates are rendered substantially dust-free, by mixing them with a caustic aqueous solution preferably according to either of two techniques described below.

PREFERRED METHOD 1:

First, an aqueous solution containing a caustic humate is prepared. This solution preferably comprises approximately 9–10 parts water and approximately 1 part of a caustic humate such as sodium humate. This aqueous solution typically has a pH of about 12.

Next, a desired amount of the humic acid bearing particulate is added to and mixed with the caustic humate solution. This mixing is performed in a conventional manner in various known types of mixing tanks or containers. Approximately 10 parts of particulate material is added to 1 part solution. For example, 100 grams of particulate ore may be added to 10 grams of the caustic humate solution. Adding approximately 1.25 lbs. of leonardite ore per gallon of solution has also achieved satisfactory results. The particulates are mixed uniformly through the solution. The applicant believes that the caustic humate solution reacts with the humic acid particles and creates a colloidal suspension. Essentially, the humic acid particles super-saturate the solution. At this stage, the humic acid on the surfaces of the particulates chemically reacts with the solution to create an adhesive humate gel. This gel instantaneously forms about the surface of each particulate when the concentration of the humic acid in the solution exceeds a super critical level. A concentration of 10:1 by weight has proven to be effective to achieve this level, although this may be varied within the scope of this invention. Alternatively, the pH of the mixture can be monitored. For example, a drop in pH from 12 to approximately 10 indicates that the solution is super-saturated with humic acid so that the gelling process occurs.

The adhesive humate gel serves to bind together adjoining particulates. A number of relatively minute particulates cling together and/or to the surface of a single larger particulate. The mixture exhibits a "snowball" effect through which a number of particles form larger, merged particles. Numbers of adjoining particles join together in groups. This binding process essentially eliminates the presence of independent dust size particulates. The binding process continues until the liquid phase of the mixture is fully depleted.

Mixing continues until the particulates are mixed uniformly through the solution. This permits the gelling and binding process to occur. The mixture is then dried in an appropriate manner. For example, the mixture may be spread out on drying sheets, mats or tables. The liquid in the mixture dissipates, primarily through evaporation and absorption of water by the particulates during gelling process. When the mixture is fully dried, the bound particulates exhibit a size and weight that are greater than those of a typical dust-size particulate of the leonardite or other humic acid bearing material. In fact, most, if not virtually all of the dust size particulates are eliminated during the mixing, gelling and binding steps. As a result, the processed particulates are substantially dust-free and may be handled and applied to the soil without generating any significant amount of dust.

As used herein, "substantially dust-free" means that the dust previously generated by these humic acid bearing particulates has been reduced significantly and to such a level that the particulate material may be handled and applied much more conveniently and less annoyingly than has been previously possible. Most, if not all of the dust, is eliminated. It should be understood that even following the use of the method of this invention, some relatively small amounts of residual dust may remain.

METHOD 2:

A caustic soda solution is added to the particulates. This solution is prepared by dissolving one part caustic soda in 9–10 parts water. The caustic soda typically comprises potassium hydroxide, sodium hydroxide or ammonium hydroxide. Potassium hydroxide is particularly preferred because the potassium is an effective fertilizing nutrient. This aqueous solution is again mixed with the particulate in a conventional type of tank or container. The concentration of particulates in the solution is selected so that a satisfactory gelling reaction is achieved. Preferably, about 10 parts of particulate ore are mixed with 1 part of caustic soda solution. The solution and particulates are mixed until a uniform consistency of particulates in solution is achieved. As a result, the humic acid in the particulates supersaturates the solution and creates a colloidal suspension. The excess humic acid reacts with the caustic solution to generate an adhesive humate gel. Once again, this gel coats the particulates and causes adjoining particulates to "exhibit a snowball effect" and bind together in balls or groups that are larger and heavier than dust size particulates of the humic acid bearing material. The mixture is permitted to dry so that the resulting particulates can be handled and applied to the soil substantially free of dust. As in the previously described method, the dust size particulates have bound together or coalesced with adjoining particulates so that these extremely fine particulates are substantially eliminated.

Varying concentrations of particulates and caustic aqueous solutions may similarly be utilized in the second method. Nonetheless, in either method there are practical limitations that are advisable to observe. In most cases, at least 3% solution by weight should be used. If higher concentrations of particulates are employed, dust-size particulates will not be adequately eliminated. On the other hand, it is usually impractical to employ more than 25% solution by weight. At concentrations greater than this, the mixture will take inordinately long to dry, due to the presence of excess water. Furthermore, it is dangerous and expensive to utilize extremely large amounts of caustic solution.

Analogous method for rendering substantially dust-free earth soil particulates that do not include a humic acid bearing material.

The technique of this invention may similarly be employed for non-humic acid bearing earth soil materials such as various derivatives of bituminous and lignite coal and fly ash. Initially, this material is reduced to particulate form in the manner previously described. The process then closely follows preferred method #1. Specifically, an aqueous caustic humate solution is prepared and mixed with a predetermined amount of particulates. Approximately ten parts of particulate material are added to one part solution. The particulates super saturate the solution and gelling occurs. In particular, an adhesive humate gel is formed about the particulates. This gel serves to bind together adjoining particulates in the manner described above. After the mixed substance is adequately dried, a relatively dust-free substance is obtained. This substance (e.g. coal, fly ash, etc.) may be conveniently transported, handled and otherwise used without generating annoying and interfering dust particulates.

Accordingly, the present invention enables an improved dust resistant fertilizer and soil conditioner to be produced relatively simply and inexpensively. The process may be practiced conveniently without adhering to precise concentrations. As a result, even untrained or unsophisticated personnel can be easily instructed in the production technique. This process permits the much more effective and widespread use of leonardite and materials in soil conditioning and fertilizing applications. Handling and application of these substances is greatly facilitated and is even made possible in windy weather conditions.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A method of rendering humic acid bearing particulates substantially free of dust-size particulates, said method comprising:

preparing a basic aqueous solution that consists of one of a group consisting of a caustic humate and a caustic soda;

mixing and supersaturating said solution with humic acid bearing particulates such that an adhesive humate gel forms about said particulates, which gel causes adjoining particulates to bind together; and allowing the mixture to dry such that the mixture is substantially free of dust-size particulates.

2. The method of claim 1 in which said aqueous solution includes approximately 9 to 10 parts water and 1 part caustic humate.

3. The method of claim 1 in which said aqueous solution includes approximately 9 to 10 parts water and 1 part caustic soda.

4. The method of claim 1 in which said caustic humate includes sodium humate.

5. The method of claim 1 in which said caustic soda is selected from the group comprising potassium hydroxide, sodium hydroxide and ammonium hydroxide.

6. The method of claim 1 in which said solution and said humic acid bearing particulates are mixed to form a colloidal suspension.

7. The method of claim 1 in which said humic acid bearing particulates comprise leonardite ore.

8. The method of claim 1 in which approximately 10 parts humic acid bearing particulates are mixed with 1 part solution.

9. The method of claim 1 in which said humic acid bearing particulates are mixed uniformly in said solution.

10. The method of claim 1 in which said adjoining particulates bind together in groups of particulates, a majority of said groups of bound particulates being larger than said dust-size particulate.

11. The method of claim 1 in which said basic aqueous solution consists exclusively of water and a caustic humate.

12. The method of claim 1 in which said basic aqueous solution consists exclusively of water and a caustic soda.

13. The method of claim 1 in which said humic acid bearing particulates absorb water to at least partially dry said mixture.

14. The method of claim 1 in which said mixture is dried by evaporating water from said mixture.

15. A method of producing humic acid bearing particulates that are substantially free of dust-size particulates, said method comprising:

forming a humic acid bearing material into particulates;

preparing a basic aqueous solution that consists of one of a group consisting of a caustic humate and a caustic soda;

mixing and supersaturating said solution with humic acid bearing particulates such that an adhesive humate gel forms about said particulates, which gel causes adjoining particulates to bind together; and allowing the mixture to dry such that the mixture is substantially free of dust-size particulates.

16. The method of claim 15 in which said basic aqueous solution consists exclusively of water and a caustic humate.

17. The method of claim 15 in which said basic aqueous solution consists exclusively of water and a caustic soda.

18. A method of rendering earth soil particulates substantially free of dust-size particulates, said method comprising:

preparing a basic aqueous solution that consists of a caustic humate;

mixing and supersaturating said solution with earth soil particulates such that an adhesive humate gel forms about said particulates, which gel causes adjoining particulates to bind together; and allowing the mixture to dry such that, the mixture is substantially free of dust-size particulates.

19. The method of claim 18 in which said basic aqueous solution consists exclusively of water and a caustic humate.

* * * * *